United States Patent
Jian et al.

(10) Patent No.: US 8,462,755 B2
(45) Date of Patent: *Jun. 11, 2013

(54) DUPLEXER/MULTIPLEXER HAVING FILTERS THAT INCLUDE AT LEAST ONE BAND REJECT FILTER

(75) Inventors: Chun-Yun Jian, Ottawa (CA); Eric Gagnon, Chelsea (CA); Lan Hu, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,152

(22) Filed: Apr. 18, 2012

(65) Prior Publication Data

US 2012/0201174 A1 Aug. 9, 2012

Related U.S. Application Data (63) Continuation of application No. 12/237,098, filed on Sep. 24, 2008, now Pat. No. 8,204,031.

(51) Int. Cl.
*H04H 20/67* (2008.01)
*H03H 7/46* (2006.01)
*H04B 1/44* (2006.01)

(52) U.S. Cl.
USPC .............................. 370/339; 333/132; 455/78

(58) Field of Classification Search
None
See application file for complete search history.

(56) References Cited

U.S. PATENT DOCUMENTS

| | | | |
|---|---|---|---|
| 8,204,031 B2 * | 6/2012 | Jian et al. ...................... 370/339 |
| 2004/0251958 A1 * | 12/2004 | Paakonen ...................... 327/552 |
| 2005/0164888 A1 * | 7/2005 | Hey-Shipton ................. 505/210 |
| 2006/0229030 A1 * | 10/2006 | Simon et al. ................... 455/78 |
| 2007/0024393 A1 * | 2/2007 | Forse et al. ................... 333/134 |

OTHER PUBLICATIONS

Jian et al., "SAW Band Reject Filter Performance at 850 MHz", 2005 IEEE Ultrasonics Symposium, Sep. 18-21, 2005, vol. 4; p. 2162-2165.*

* cited by examiner

*Primary Examiner* — Clemence Han
(74) *Attorney, Agent, or Firm* — Meyertons, Hood, Kivlin, Kowert & Goetzel, P.C.

(57) ABSTRACT

A wireless communications device includes an antenna, a multi-port path selection structure having an antenna port connected to the antenna, and plural ports connected to respective one or more receive and transmit paths of the wireless communications device. The multi-port path selection structure has a transmit band reject filter connected to the transmit path and a second filter connected to the receive path.

18 Claims, 8 Drawing Sheets

DUPLEXER/MULTIPLEXER HAVING FILTERS THAT INCLUDE AT LEAST ONE BAND REJECT FILTER

CROSS-REFERENCE TO RELATED APPLICATIONS

This application is a continuation of and claims priority to U.S. patent application Ser. No. 12/237,098 filed on Sep. 24, 2008, published as U.S. 2010/0074240 A1, and entitled "Duplexer/Multiplexer Having Filters That Include At Least One Band Reject Filter," which is hereby incorporated herein by reference in its entirety.

TECHNICAL FIELD

The invention relates generally to a duplexer/multiplexer that has filters including at least one band reject filter.

BACKGROUND

Wireless communications devices, such as wireless terminals or wireless base stations, include wireless transceivers to perform wireless communications, such as radio frequency (RF) communications. A wireless communications device can include a duplexer (or multiplexer) to allow simultaneous transmission and reception in different frequency bands using the same antenna while ensuring that relatively high power transmit signals transmitted by the wireless transceiver do not swamp relatively low power receive signals received by the wireless transceiver.

A duplexer has an antenna port (for connection to an antenna), a receive port (to receive a signal from the antenna port) and transmit port (to transmit a signal to the antenna port). A multiplexer has an antenna port and one or more receive ports and one or more transmit ports. Note that a duplexer is a type of multiplexer.

A duplexer or multiplexer can include bandpass filters implemented with acoustic-type resonators. Conventional duplexers/multiplexers including bandpass filters implemented with acoustic-type resonators have relatively limited maximum power handling capabilities, which can prevent use of such conventional duplexers/multiplexers in high-power, high-frequency applications, such as in Worldwide Interoperability for Microwave Access (WiMax) applications or Long-Term Evolution (LTE) applications. WiMax is based on the IEEE (Institute of Electrical and Electronics Engineers) 802.16 Standard (as amended by the IEEE 802.16e or IEEE 802.16e-005). WiMax is able to provide broadband wireless connectivity for mobile stations at relatively high data rates. LTE is a technology that provides an enhancement to the Universal Mobile Telecommunications System (UMTS) technology. LTE is described in 3GPP TS 23.401 and 23.402.

In conventional duplexers/multiplexers that employ bandpass filters with acoustic-type resonators, high-power and high-frequency communications can cause ultrasonic vibration in metallic electrodes of the acoustic-type resonators, which can lead to a phenomenon referred to as acousto-migration, in which metal grain boundaries in the resonators migrate. The acousto-migration phenomenon can reduce the lifetime of the filters. Therefore, such filters may not survive for a desirable length of time at desired power levels and frequencies that may be required in certain types of wireless networks.

SUMMARY

In general, according to an embodiment, a wireless communications device includes an antenna and a multi-port path selection structure (e.g., a duplexer or multiplexer) having an antenna port connected to the antenna, and plural ports connected to respective receive and transmit paths of the wireless communications device. The multi-port path selection structure has a band reject filter connected to the transmit path and a second filter connected to the receive path.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, a multi-port path selection structure for use in a wireless communications device is provided that has an antenna port connected to an antenna of the wireless communications device, and plural ports connected to respective receive and transmit paths of the wireless communications device. Examples of the wireless communications device include a wireless terminal (mobile station), a wireless base station, and other devices that are capable of performing wireless communications.

A multi-port path selection structure can be a duplexer or a multiplexer. Generally, a multi-port path selection structure includes circuitry to selectively route signals that are communicated along transmit and receive paths of the wireless communications device. Such circuitry can receive a signal from the antenna of the wireless communications device, and route the received signal to the receive path of the wireless communications device. Similarly, the multi-port path selection structure can route a transmitted signal from transmission circuitry in the transmit path of the wireless communications device to the antenna. The "routing" of the received and transmitted signals is accomplished by use of filters provided in the multi-port path selection structure, where the filters are designed to pass signals in respective receive and transmit frequency bands. In accordance with some embodiments, the filter connected to the transmit path is a band reject filter, and the filter connected to the receive path can either be a band-pass filter or band reject filter.

A duplexer has an antenna port connected to the antenna of the wireless communications device, and a single receive port and a single transmit port for connection to respective receive and transmit paths of the wireless communications device. A multiplexer includes an antenna port for connection to the antenna of the wireless communications device, and two or more ports connected to respective receive and transmit paths. Note that a duplexer is a type of multiplexer.

A multiplexer can have plural receive ports (corresponding to different receive frequency bands) and/or plural transmit ports (corresponding to different transmit frequency bands). The multiple receive ports can be connected to one or plural receive paths in the wireless communications device. The multiple transmit ports can be connected to one or plural transmit paths in the wireless communications device. Note that it is possible for multiple receive frequency bands and/or multiple transmit frequency bands to share just one receive path or transmit path, respectively, since a wireless communications device normally operates at just a single receive or transmit frequency band at any given time. Alternatively, separate paths in the wireless communications device can be provided for different receive frequency bands or different transmit frequency bands.

Figure 1:
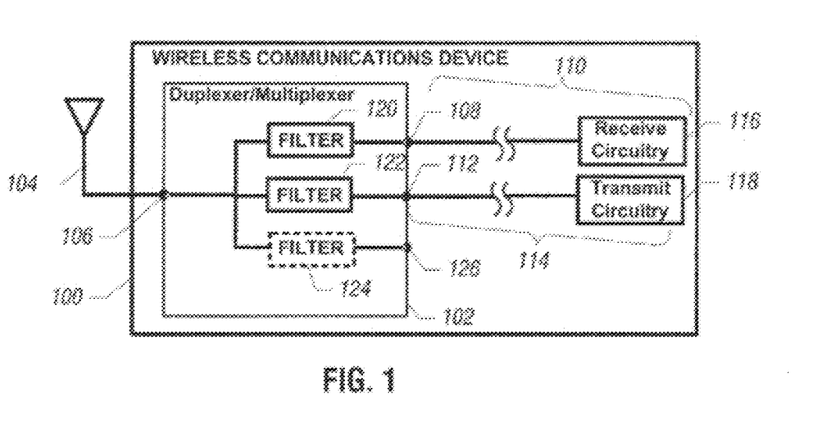
FIG. 1 is a block diagram of a wireless communications device that includes a duplexer or multiplexer according to an embodiment.

FIG. 1 illustrates an exemplary wireless communications device 100 that includes a duplexer or multiplexer 102 according to an embodiment. In the ensuing discussion, reference is made to "multiplexer" 102, although it is to be understood that the discussion applies equally to a duplexer. The wireless communications device 100 has an antenna 104 for communicating radio frequency (RF) signals with another communications device. For example, the wireless communications device 100 can be a wireless terminal (e.g., mobile station) to communicate wirelessly with a wireless base station. Alternatively, the wireless communications device 100 can be base station for communicating with a wireless terminal.

The wireless communications device can be used in a wireless communications network, such as a WiMax (Worldwide Interoperability for Microwave Access) network, a Long-Term Evaluation (LTE) network, or any other type of network. Reference to LTE is to any technology based on LTE, such as defined by current standards 3GPP TS 23.401 and 23.402 or any subsequent standard. Reference to LTE can also refer to any subsequent standard derived from an evolution of LTE, whether or not such subsequent standard is referred to as "LTE" by name.

The multiplexer 102 has an antenna port 106 that is connected to the antenna 104. The antenna port 106 of the multiplexer 102 is "connected" to the antenna 104 either directly or indirectly (through other circuitry).

The multiplexer also has a receive port 108 for connection to a receive path 110 of the wireless communications device 100, and a transmit port 112 for connection to a transmit path 114 of the wireless communications device. The receive path 110 includes receive circuitry 116 to receive a signal from the antenna 104 through the multiplexer 102. The transmit path 114 includes transmit circuitry 118 to generate a transmit signal to be sent through the multiplexer 102 onto the antenna 104.

The multiplexer 102 has filters 120 and 122 for passing signals in the receive and transmit frequency bands, respectively. Also shown in dashed profile is another filter 124 and another port 126, where the other filter 124 and port 126 can be connected to a transmit path or a receive path, depending upon the specific configuration of the wireless communications device 100.

Figure 2:
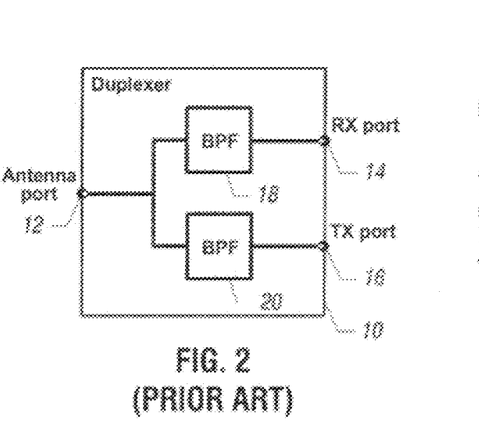
FIG. 2 is a schematic diagram of a conventional duplexer that includes bandpass filters connected to a receive port and a transmit port of the duplexer.

A conventional duplexer 10 is depicted in FIG. 2, where the conventional duplexer 10 has an antenna port 12, a receive port 14 (that is connected to a receive path of a wireless communications device), and a transmit port 16 (that is connected to a transmit path of the wireless communications device). The conventional duplexer 10 uses bandpass filters (BPFs) 18 and 20 connected to the receive and transmit ports 14 and 16, respectively. The bandpass filters 18 and 20 can be implemented with acoustic-type resonators.

Figure 3:
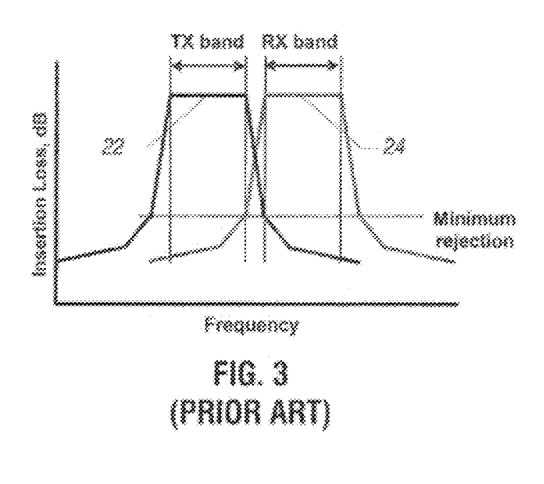
FIG. 3 is a graph illustrating the transmit and receive bands provided by the bandpass filters of FIG. 2.

FIG. 3 is a graph of the transmit frequency band 22 and receive frequency band 24 provided by the bandpass filters 20 and 18, respectively. The graph of FIG. 3 plots insertion loss (in terms of decibel or dB) as a function of frequency. Insertion loss is the decrease in signal power resulting from insertion of a device in a communications path. As discussed above, the bandpass filters 18 and 20 of a conventional duplexer such as duplexer 10 are subject to deterioration caused by the acousto-migration phenomenon at high power and high frequencies.

In accordance with some embodiments, instead of using bandpass filters 18 and 20 in the duplexer 10 as conventionally done, a duplexer 200 (depicted in FIG. 4) can be provided that includes a band reject filter 202 connected to a transmit port of the duplexer 200, and a receive filter 204 connected to a receive port of the duplexer 200. Both the band reject filter 202 and receive filter 204 are connected to an antenna port.

Figure 4:
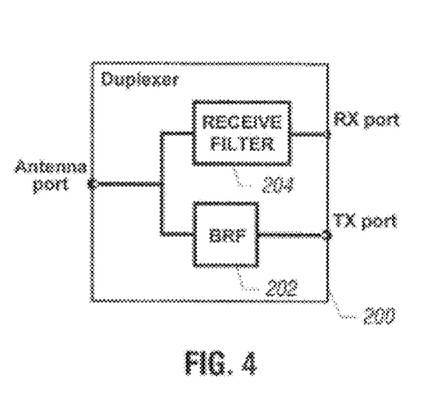
FIG. 4 is a schematic diagram of a duplexer that includes a receive filter connected to a receive port, and a band reject filter connected to a transmit port, according to an embodiment.

The receive filter 204 can either be a bandpass filter or a band reject filter, in accordance with some embodiments.

Typically, the transmit signals that are sent from the transmit port to the antenna port through the duplexer 200 are associated with relatively high power, while the receive signals communicated from the antenna port to the receive port through the duplexer 200 are associated with relatively low power. The receive filter 204 operates to protect the receive port (and receive circuitry connected to the receive port) against the high-power transmit signals communicated through the duplexer 200.

Note that with the band reject filter 202, the acoustic vibration is relatively strong in the reject band, but relatively weak in the pass band of the band reject filter. This enables the band reject filter 202 to handle relatively high power transmit signals with reduced acousto-migration issues. Moreover, another characteristic of a band reject filter is that it has lower phase distortion and less ripple in the pass band, as compared to a bandpass filter.

Figure 5:
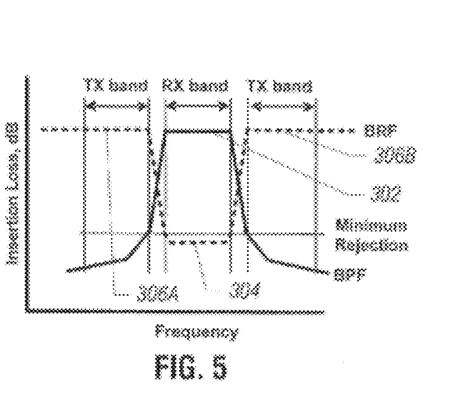
FIG. 5 is a graph illustrating the transmit and receive bands provided by the filters of FIG. 4.

Assuming the receive filter 204 is implemented with a bandpass filter, then the receive and transmit frequency bands are depicted in FIG. 5, which plots insertion loss as a function of frequency. The bandpass filter 204 provides a pass band 302—any signal having a frequency below or above the pass band 302 is attenuated or rejected by the bandpass filter 204. The band reject filter 202 provides a reject band 304—any signal having a frequency within the reject band 304 is attenuated or rejected, and any signal having a frequency above or below the reject band 304 is passed through the band reject filter 202. The pass band 302 and reject band 304 of FIG. 5 overlap. The pass band for the transmit path provided by the band reject filter 202 is represented by reference numerals 306A and 306B, which are on the two sides of the reject band 304 (and of the pass band 302 provided by the bandpass filter 204).

In the receive direction, the bandpass filter 204 passes a signal from the antenna port to the receive port of the duplexer 200 if the signal has a frequency within the receive band 302. On the other hand, in the transmit direction, the band reject filter 202 passes a signal having a frequency outside the reject band 304 through the band reject filter 202 from the transmit port to the antenna port.

Figure 6:
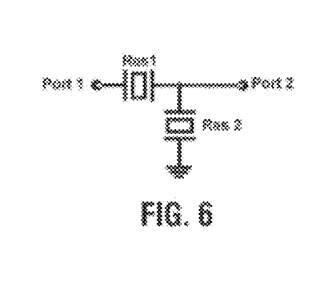
FIG. 6 illustrates acoustic-type resonators arranged in a ladder-type configuration for implementing a band reject filter for use in a duplexer or multiplexer according to an embodiment.

A band reject filter can be implemented with acoustic-type resonators RES1 and RES2 arranged in a ladder-type configuration, as depicted in FIG. 6. The ladder-type configuration includes a first acoustic-type resonator RES1 (referred to as "series resonator") connected in series between two ports PORT1 and PORT2, and a second acoustic-type resonator RES2 (referred to as "shunt resonator") connected between PORT2 and ground. Note that in the ladder-type configuration, there can be two (or more) series resonators between PORT1 and PORT2, and two (or more) shunt resonators connected between nodes of the filter and ground.

Each of the resonators RES1 and RES2 can be any one of a surface acoustic wave (SAW) resonator, a thin film bulk acoustic resonator (FBAR), a bulk acoustic wave (BAW) resonator, or any other type of acoustic-type resonator. The BAW resonator can be a surface mounted resonator (SMR)-type BAW resonator.

Figure 7:
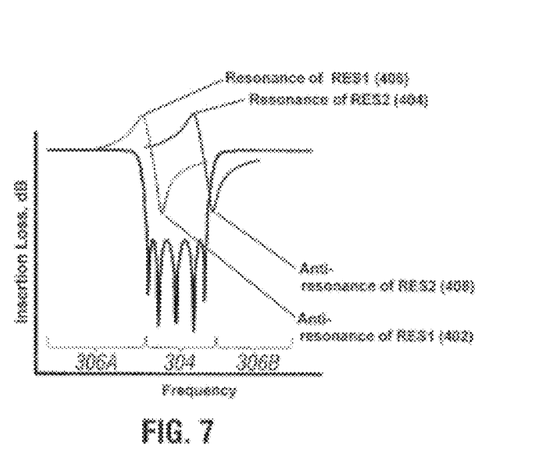
FIG. 7 is a graph illustrating the resonance and anti-resonance frequencies of the resonators of FIG. 6.

The series resonator RES1 of FIG. 6 is designed to present a high impedance at the reject band 304 of interest. The series resonator RES1 is configured to be anti-resonance at a reject band frequency (the anti-resonance frequency for the series resonator RES1 is depicted in FIG. 7, according to one example), which means that the series resonator RES1 presents a high impedance at the anti-resonance frequency. In contrast, the shunt resonator RES2 is configured to provide a low impedance at a reject band frequency (a frequency within reject band 304). This is achieved by designing the shunt resonator RES2 to be at or near resonance in the reject band 304. The resonance frequency of the shunt resonator RES2 is represented as 404 in FIG. 7.

The resonance frequency of series resonator RES1 is represented as 406 in FIG. 7, while the anti-resonance frequency of the shunt resonator RES2 is represented as 408 in FIG. 7. The resonance frequency 406 of the series resonator RES1 is immediately below the reject band 304 and is between the pass band 306A and the reject band 304 of the band reject filter—at the resonance frequency 406, the series resonator RES1 has a low impedance. In the pass band 306A, the shunt resonator RES2 simply presents a capacitive load to ground.

The anti-resonance frequency 408 of the shunt resonator RES2 is immediately above the reject band 304 and is between the reject band 304 and the pass band 306B—at the anti-resonance frequency 408, the shunt resonator RES2 presents a high impedance to ground. However, in the pass band 306B, the series resonator RES1 presents a capacitive series impedance. At frequencies much above or below the reject band 304, the series and shunt resonators simply behave as high-Q capacitors.

In this manner, the overall effect of the filter provided by resonators RES1 and RES2 is to provide a high impedance for signals passing between ports PORT1 and PORT2 having frequencies in the reject band 304.

Figure 8:
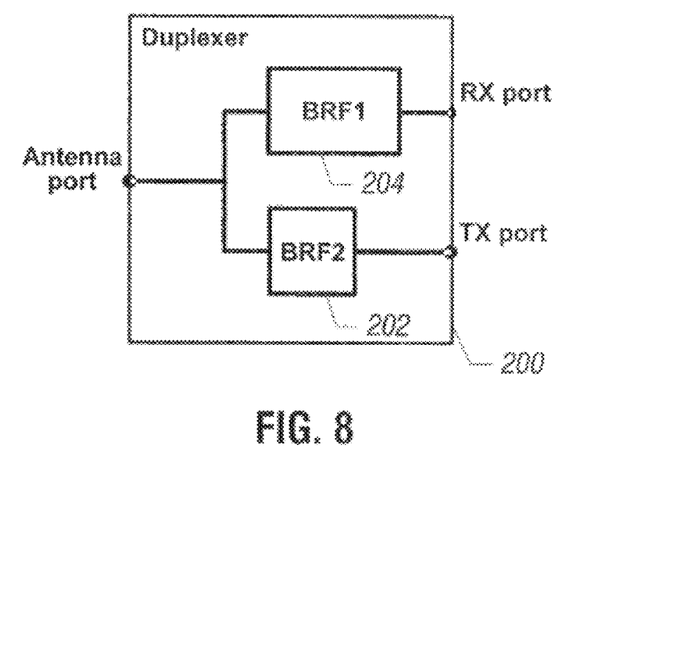
FIG. 8 is a schematic diagram of a duplexer according to another embodiment that includes a band reject filter connected to a receive port, and a band reject filter connected to a transmit port.

FIG. 8 shows an implementation of the duplexer 200 in which the receive filter 204 is implemented with a band reject filter (instead of a bandpass filter as depicted in FIG. 4). In this configuration, both the receive and transmit ports of the duplexer 200 are connected to band reject filters.

Figure 9:
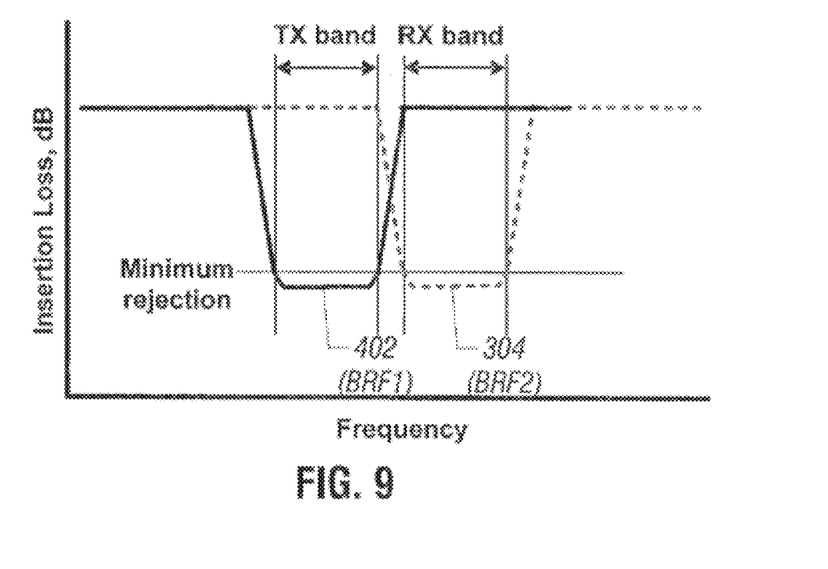
FIG. 9 is a graph illustrating the transmit and receive bands provided by the filters of FIG. 8.

As depicted in FIG. 9, the band reject filter 202 for the transmit port is associated with the transmit reject band 304, while the band reject filter 204 for the receive port has a receive reject band 402. The band reject filter 204 allows a signal having a frequency outside the receive reject band 402 to be passed through the band reject filter 204, whereas the band reject filter 202 allows a signal having a frequency outside the transmit reject band 304 to pass through the band reject filter 202.

Figure 10:
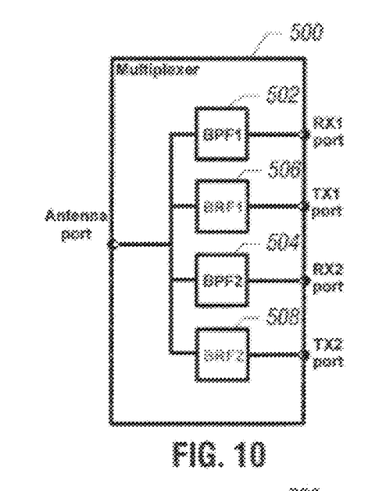
FIG. 10 is a schematic diagram of a multiplexer that includes bandpass filters connected to receive ports, and band reject filters connected to transmit ports, according to another embodiment.

FIG. 10 shows a multiplexer 500 that has an antenna port, two receive ports (RX1 port and RX2 port), and two transmit ports (TX1 port and TX2 port). Note that the two receive ports can be connected to just one receive path (and the associated receive circuitry, such as circuitry 116 in FIG. 1), or alternatively, the two receive ports can be connected to two different receive paths. Similarly, the transmit ports can be connected to just one transmit path (and the associated transmit circuitry, such as 118 in FIG. 1), or alternatively, the transmit ports can be connected to multiple transmit paths. In other implementations, the multiplexer 500 can have more than two transmit ports and/or more than two receive ports. The different receive ports are associated with different receive frequency bands, and the different transmit ports are associated with different transmit frequency bands.

The receive ports of the multiplexer 500 are connected to corresponding bandpass filters 502 and 504, whereas the transmit ports are connected to band reject filters 506 and 508. Each of the bandpass filters and band reject filters 502, 504, 506, and 508 is connected to the antenna port of the multiplexer 500.

Figure 11:
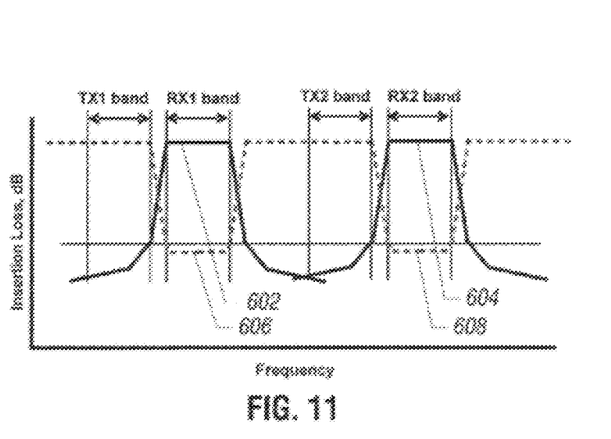
FIG. 11 is a graph illustrating the transmit and receive bands provided by the filters of FIG. 10.

As depicted in the graph of FIG. 11, a receive pass band 602 corresponds to the pass band provided by the bandpass filter 502 for the RX1 port, and a receive pass band 604 is provided by the bandpass filter 504 for the RX2 port.

A transmit reject band 606 is provided by the band reject filter 506 for the TX1 port, and a transmit reject band 608 is provided by the band reject filter 508 for the TX2 port.

Figure 12:
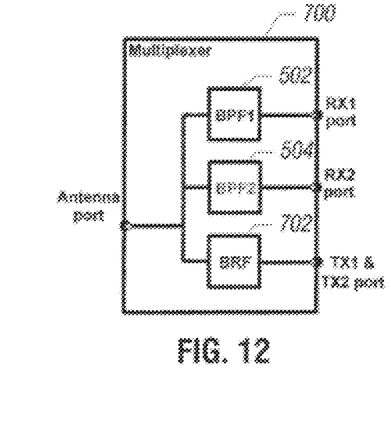
FIG. 12 is a schematic diagram of a multiplexer that includes bandpass filters connected to receive ports, and a band reject filter connected to a transmit port, according to a further embodiment.

While FIG. 10 shows separate band reject filters 506 and 508 to provide two respective reject bands 606 and 608 (FIG. 11), note that a single band reject filter can be used instead, such as band reject filter 702 in a multiplexer 700 depicted in FIG. 12, to provide multiple reject bands. The multiplexer 700 has one transmit port connected to the band reject filter 702.

Figure 13:
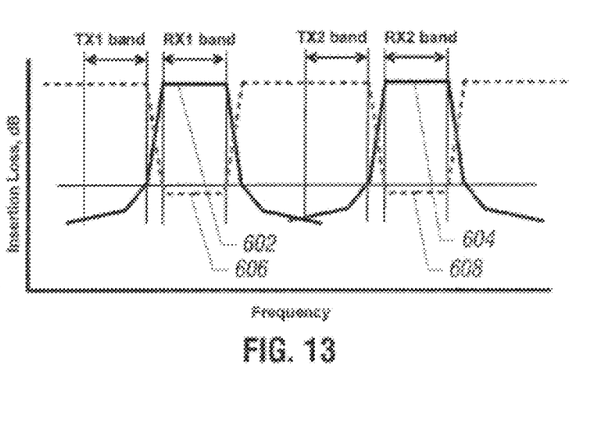
FIG. 13 is a graph illustrating the transmit and receive bands provided by the filters of FIG. 12.

The chart of FIG. 13 depicts receive pass bands 602 and 604 and transmit reject bands 606 and 608 that are the same as those depicted in FIG. 11, except that the reject bands 606 and 608 of FIG. 13 are provided by one band reject filter 702 (FIG. 12), instead of two distinct band reject filters 506 and 508 (FIG. 10).

Figure 14:
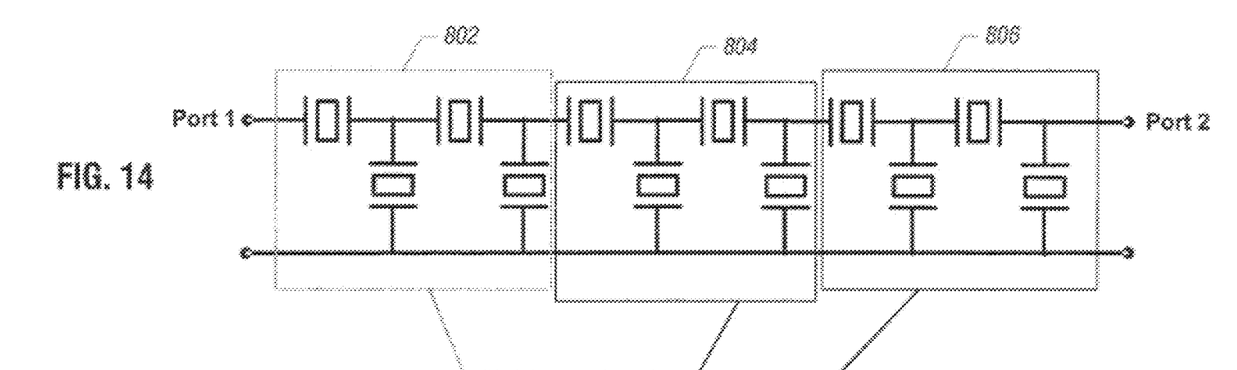
FIG. 14 is a schematic diagram of a band reject filter formed of cascaded band reject filter units to provide multiple reject bands, according to an embodiment.
Figure 15:
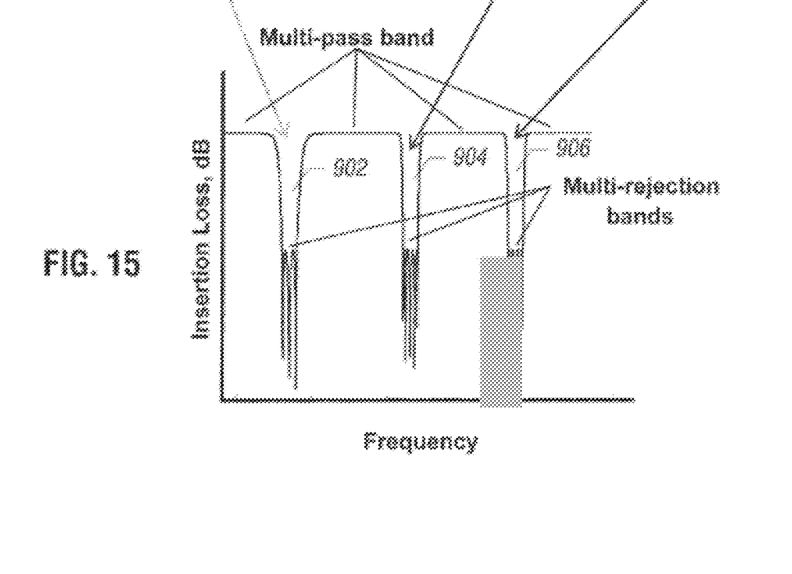
FIG. 15 is a graph illustrating the multiple reject bands provided by the band reject filter of FIG. 14.

The band reject filter 702 includes multiple cascaded band reject filter units to provide the multiple reject bands 606 and 608. Cascading multiple band reject filter units means that the band reject filter units are connected in series. For example, as depicted in FIG. 14, three band reject filter units 802, 804, and 806 are connected in series (cascaded) between PORT1 and PORT 2. Each of the band reject filter units 802, 804, and 806 defines a respective reject band, as depicted in FIG. 15. The band reject filter unit 802 provides reject band 902, the band reject filter unit 804 provides reject band 904, and the band reject filter unit 806 provides reject band 906. Each of the band reject filter units contains an arrangement of resonators; in the embodiment of FIG. 14, each band reject filter unit includes two series resonators and two shunt resonators arranged in the ladder-type configuration. To provide the two transmit reject bands 606 and 608 of FIG. 13, two band reject filter units (e.g., any two of 802, 804, and 806) can be connected in series (cascaded) to form the band reject filter 702. In other implementations, the resonators of all band reject filter units can be arranged in a mixed configuration for their locations in the ladder-type structure, namely each of the band reject filter units can have its resonators distributed in the entire filter structure and does not have to have all its resonators arranged together.

Figure 16:
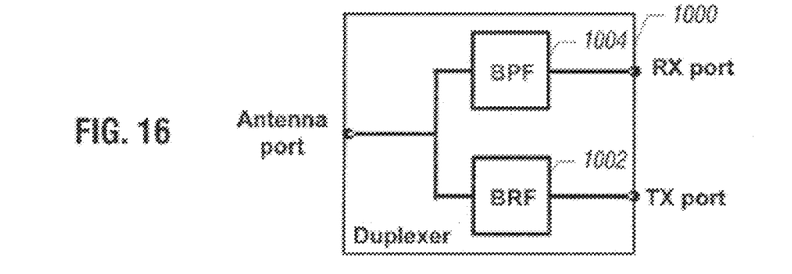
FIG. 16 is a schematic diagram of a duplexer according to a further embodiment that includes a bandpass filter connected to a receive port, and a band reject filter connected to a transmit port.
Figure 17:
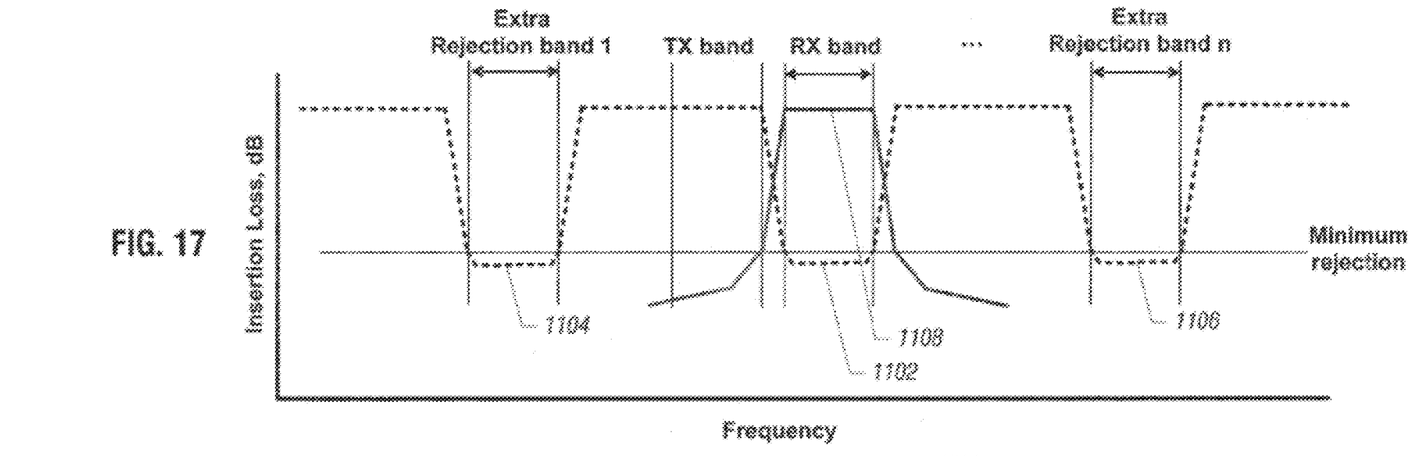
FIG. 17 is a graph illustrating the transmit and receive bands provided by the filters of FIG. 16.

FIG. 16 shows an alternative embodiment of a duplexer 1000 that has a band reject filter 1002 for the transmit port that provides multiple reject bands 1102, 1104, and 1106 (FIG. 17). The band reject filter 1002 is thus able to block signals having frequencies in any of the reject bands 1102, 1104, and 1106.

A bandpass filter 1004 connected to the receive port of the duplexer 1000 provides a pass band 1108 (FIG. 17).

Figure 18:
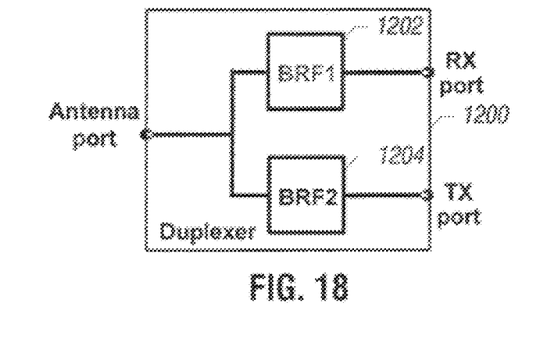
FIG. 18 is a schematic diagram of a duplexer according to yet a further embodiment that includes a band reject filter connected to a receive port, and a band reject filter connected to a transmit port.
Figure 19:
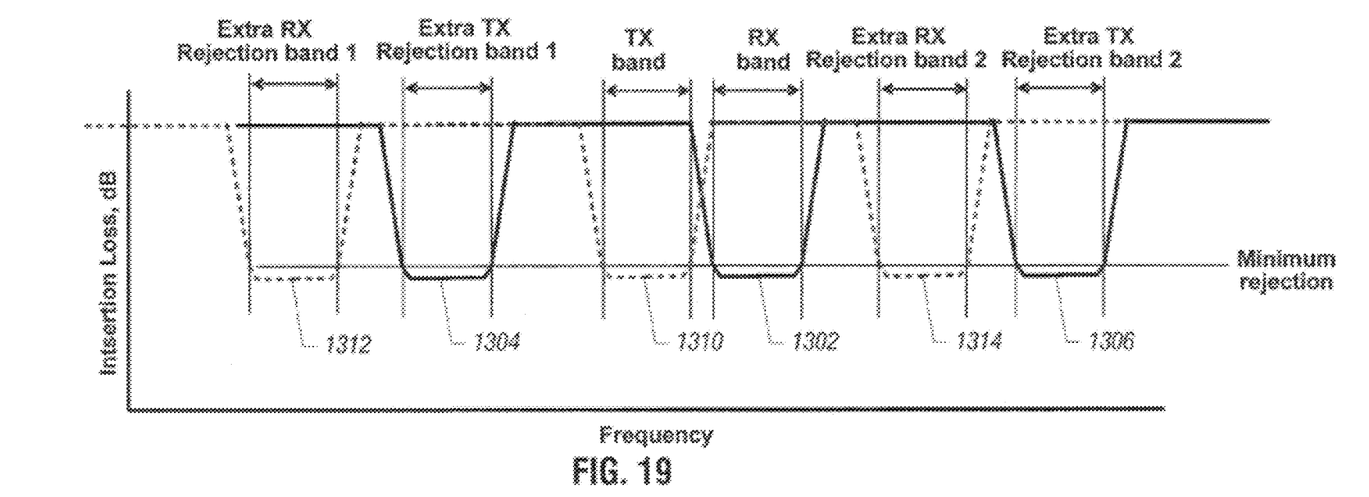
FIG. 19 is a graph illustrating the transmit and receive bands provided by the filters of FIG. 18.

FIG. 18 shows another embodiment of a duplexer 1200 that includes band reject filter 1202 connected to a receive port of the duplexer 1200, and band reject filter 1204 connected to the transmit port of the duplexer 1200. Each of the band reject filters 1202 and 1204 provides multiple reject bands, as depicted in FIG. 19. The band reject filter 1202 for the receive port provides reject bands 1312, 1310, and 1314, while the band reject filter 1204 for the transmit port provides reject bands 1304, 1302, and 1306.

Figure 20:
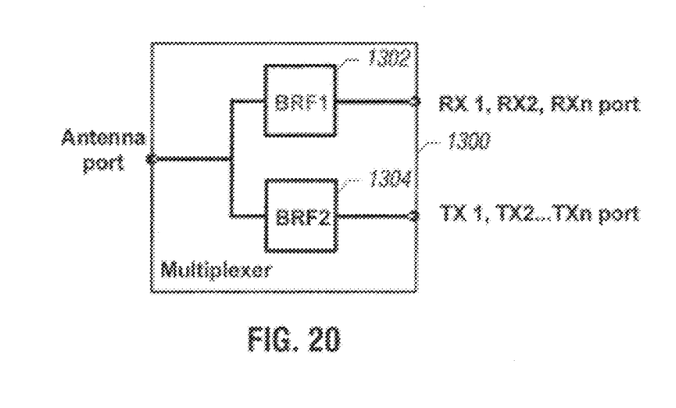
FIG. 20 is a schematic diagram of a multiplexer that includes a band reject filter connected to a receive port, and a band reject filter connected to a transmit port, according to a further embodiment.
Figure 21:
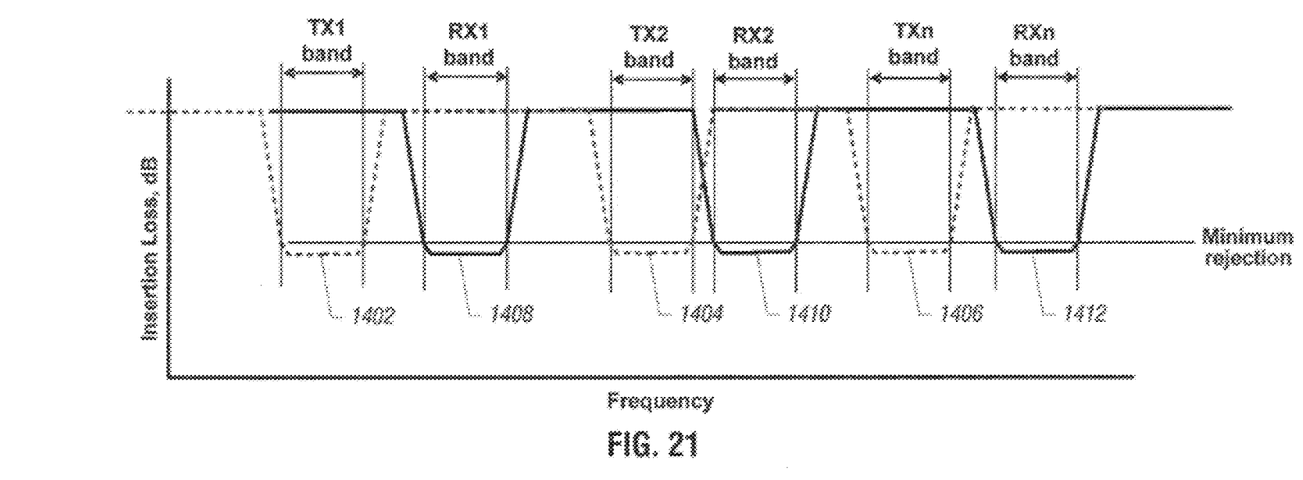
FIG. 21 is a graph illustrating the transmit and receive bands provided by the filters of FIG. 20.

FIG. 20 shows another embodiment of a multiplexer 1300 that includes a first band reject filter 1302 for the RX1, RX2, . . . , RXn port, and a second band reject filter 1304 for the TX1, TX2, . . . , TXn port. The band reject filter 1302 provides reject bands 1402, 1404, and 1406, whereas the band reject filter 1304 provides reject bands 1408, 1410, and 1412, as depicted in FIG. 21.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A wireless communications device, comprising:
   an antenna;
   a receiver;
   a receive path connected between the antenna and the receiver and configured to couple the antenna to the receiver;
   a transmitter; and
   a transmit path connected between the transmitter and the antenna, wherein the transmit path includes a single transmit path filter device, and wherein the transmit path filter device comprises an acoustic resonator based band reject filter device;
   wherein the receive path includes a single receive path filter device comprising an acoustic resonator based band reject filter device; and
   wherein each of the transmit path filter device and the receive path filter device provides multiple reject bands.

2. The wireless communications device of claim 1, wherein the receive path comprises a band pass filter.

3. The wireless communications device of claim 2, wherein the band pass filter comprises an acoustic resonator based band pass filter.

4. The wireless communications device of claim 1, wherein the transmit path is coupled to the receive path in a duplexer, the acoustic resonator based band reject filter being part of the duplexer.

5. The wireless communications device of claim 1, wherein the wireless communications device comprises:
   a plurality of receivers;
   a plurality of receive paths, each receive path connected between the antenna a respective receiver and configured to couple the antenna to the respective receiver;
   a plurality of transmitters; and
   a plurality of transmit paths, each transmit path connected between a respective transmitter and the antenna and coupled to a respective receive path, wherein each transmit path includes a single respective transmit path filter device, and wherein each transmit path filter device comprises an acoustic resonator based band reject filter.

6. The wireless communications device of claim 5, wherein the transmit paths are coupled to the receive paths in a multiplexer, the acoustic resonator based band reject filters being part of the multiplexer.

7. The wireless communications device of claim 1, wherein the wireless communications device comprises a wireless mobile station.

8. The wireless communications device of claim 1, wherein the wireless communications device comprises a wireless base station.

9. The wireless communications device of claim 8, wherein the receive path comprises a receive path band reject filter.

10. The wireless communications device of claim 1, wherein the acoustic resonator based band reject filter device is based on at least one of surface acoustic wave (SAW) resonators, thin film bulk acoustic resonators (FBAR), and bulk acoustic wave (BAW) resonators.

11. The wireless communications device of claim 1, wherein the acoustic resonator based band reject filter device comprises acoustic resonators arranged in a ladder-type configuration.

12. The wireless communications device of claim 1, wherein the transmit path band reject filter device has relatively weak acoustic vibration outside of a reject band of the transmit path band reject filter device, and relatively strong acoustic vibration inside the reject band of the transmit path band reject filter device.

13. A method comprising:
coupling a transmitter of a wireless communications device to an antenna via a transmit path that includes a single transmit path filter device, wherein the transmit path filter device comprises an acoustic resonator based band reject filter device that rejects multiple frequency bands;
coupling a receiver to the antenna via a receive path, wherein the receive path includes a single receive path filter device comprising an acoustic resonator based band reject filter device that rejects multiple frequency bands; and
wherein the transmit path filter device isolating the receive path from one or more particular frequencies transmitted by the transmitter.

14. The method of claim 13, wherein the transmit path is coupled to the receive path in a duplexer, the acoustic resonator based band reject filter being part of the duplexer.

15. The method of claim 13 further comprising:
coupling a plurality of additional receivers to the antenna via a plurality of respective receive paths;
coupling a plurality of additional transmitters to the antenna via a plurality of respective transmit paths;
wherein each respective transmit path includes a single transmit path filter device, wherein each transmit path filter device comprises an acoustic resonator based band reject filter.

16. The method of claim 15, wherein the transmit paths are coupled to the receive paths in a multiplexer, the acoustic resonator based band reject filters being part of the multiplexer.

17. The method of claim 13, wherein the wireless communications device comprises a wireless mobile station.

18. The method of claim 13, wherein the wireless communications device comprises a wireless base station.

* * * * *